United States Patent
Desurvire et al.

[11] Patent Number: 5,892,876
[45] Date of Patent: Apr. 6, 1999

[54] OPTICAL FIBER INCLUDING A FLUORESCENT DOPANT

[75] Inventors: Emmanuel Desurvire, Bruyeres Le Chatel; Pascale Nouchi, Villebon Sur Yvette; Christian Le Sergent, Marcoussis, all of France

[73] Assignee: Alcatel Submarine Networks, Clichy, France

[21] Appl. No.: 860,374

[22] PCT Filed: Oct. 24, 1996

[86] PCT No.: PCT/FR96/01664

§ 371 Date: Jun. 25, 1997

§ 102(e) Date: Jun. 25, 1997

[87] PCT Pub. No.: WO97/16875

PCT Pub. Date: May 9, 1997

[30] Foreign Application Priority Data

Oct. 31, 1995 [FR] France ................................... 95 12859

[51] Int. Cl.⁶ .................................................. G02B 6/02
[52] U.S. Cl. ............................ 385/123; 385/126; 385/124
[58] Field of Search ...................... 385/123–128

[56] References Cited

U.S. PATENT DOCUMENTS 4,923,279  5/1990  Ainslie et al. ........................ 385/123
5,121,460  6/1992  Tumminelli et al. .................. 385/126
5,673,354  9/1997  Akasaka et al. ...................... 385/127

FOREIGN PATENT DOCUMENTS 05 24 591 A1  1/1993  European Pat. Off. .
06 02 467 A1  6/1994  European Pat. Off. .

OTHER PUBLICATIONS

Patent Abstracts of Japan, vol. 017, No. 320 (P–1558), 17 Jun. 1993, corresponding to JPA 05 034528 (Fujikura LTD) 12 Feb. 1993.

*Primary Examiner*—Phan T.H. Palmer
*Attorney, Agent, or Firm*—Sughrue, Mion, Zinn, Macpeak & Seas, PLLC

[57] ABSTRACT

The present invention relates to an optical fiber comprising an optical core (6) based on silica for guiding the majority of lightwaves and containing at least one fluorescent dopant, surrounded by optical cladding (5) likewise based on silica, and having a refractive index lower than that of said core, said core comprising: a central zone (2) of radius $a_0$, containing said fluorescent dopant; and a peripheral zone (4) of radius a, surrounding said central zone, having a refractive index greater than that of said cladding, and not containing fluorescent dopant; the fiber being characterized in that said core (6) further comprises an intermediate zone (3) of radius $a_1$ and having a softening temperature greater than that of central zone (2), said intermediate zone (3) being such that $a_0 < a_1 < a$ and not containing any fluorescent dopant.

12 Claims, 2 Drawing Sheets

OPTICAL FIBER INCLUDING A FLUORESCENT DOPANT

The present invention relates to an optical fiber including at least one fluorescent dopant, in particular a fiber adapted to be used in optical fiber amplifiers or lasers.

Apparatuses in which a fiber is used containing a fluorescent dopant capable of interacting with an excitation signal, referred to as a "pumping" signal for the purpose of obtaining a desired output signal, i.e. an optical oscillator or an optical amplifier, are subject to a great deal of study at present. The same type of optical fiber is used both in lasers and in amplifiers: the fiber is an optical fiber of conventional structure having an optical core for guiding the majority of the lightwaves, doped by means of a fluorescent dopant, and surrounded by optical cladding. Two types of signal are conveyed by such an optical fiber: pumping signals and useful signals conveying information, referred to as "signals to be transmitted". The fluorescent dopant may be an element having three or four transition levels. By way of example it may be a rare earth such as erbium.

The operation of apparatus making use of the fluorescence effect relies on the following basic principle: ions of fluorescent dopant, referred to as "active" ions, initially in their fundamental state, absorb the photons of the pumping signal, thereby transferring them to an excited higher transition level; this phenomenon is known as "population inversion", and the dopant ions in this excited state are said to be "inverted". From this excited level, inverted ions can subsequently return to their fundamental state by emitting a photon, i.e. by means of a laser transition. In an optical amplifier or laser type apparatus, such emission is stimulated by the presence of a photon of a signal to be transmitted, and consequently the operation of such apparatus also depends on the interaction between active ions and photons in said signal at the wavelength thereof.

In order to obtain the population inversion that is essential for laser operation, it is necessary to pump at least half the active ions from their fundamental state to the excited higher level. At any particular point of the core of the optical fiber, if less than half of the active ions are inverted, then the signal to be transmitted is attenuated at said point because the non-inverted active ions absorb photons.

Consequently, in order to make best use of the pumping power injected into an optical fiber doped by means of a fluorescent dopant, it is preferable to confine the active dopant within the zone of the fiber that coincides with the peak intensity of pumping, i.e. around the axis of the fiber, and to avoid having any active ions located where the pumping intensity is weaker.

The intensity maximum of a monomode signal lies likewise on the axis of the fiber, so a monomode signal interacts effectively with the inverted ions.

A known solution for confining the fluorescent dopant to where the pumping intensity is at a peak is described in U.S. Pat. No. 4,923,279. That solution consists in subdividing the core into two zones, an active central zone containing the fluorescent dopant, and a peripheral zone in contact with the central zone but not containing fluorescent dopant.

In conventional manner, the central zone is also doped with aluminum, firstly to avoid the effect whereby erbium ions can become segregated in the core ("clustering"), where clustering considerably decrease the performance of the doped fiber for reasons that need not be explained in detail herein, and secondly as an index-raising dopant. Also, in order to obtain monomode guidance in the core, the peripheral zone is doped with one or more index-raising dopants.

It is recalled that such dopants raise the refractive index relative to that of the optical cladding, which generally has an index that is substantially equal to that of pure silica.

Nevertheless, that solution is not satisfactory.

Known index-raising dopants, and in particular aluminum, germanium, and phosphorus, also cause the softening temperature of the silica in which they are incorporated to decrease. Thus, the two adjacent zones of the core (the central zone and the peripheral zone) have reduced softening temperatures.

Unfortunately, when the preform is manufactured by a chemical vapor deposition (CVD) method, the operation of collapsing the preform which is performed at high temperature, higher than the softening temperature of the various zones of the core, gives rise to significant softening of the core. As a result, the dopants in the various zones thereof tend to interdiffuse, and in particular the fluorescent dopant migrates towards the peripheral zone of the core and is no longer confined in its central zone. This has the highly unfortunately effect of reducing pumping efficiency.

An object of the present invention is to avoid migration of the fluorescent dopant away from the active zone.

To this end, the invention provides an optical fiber comprising an optical core based on silica for guiding the majority of lightwaves and containing at least one fluorescent dopant, surrounded by optical cladding likewise based on silica, and having a refractive index lower than that of said core, said core comprising:

a central zone of radius $a_0$, containing said fluorescent dopant; and a peripheral zone of radius $\underline{a}$, surrounding said central zone, having a refractive index greater than that of said cladding, and not containing fluorescent dopant;

the fiber being characterized in that said core further comprises an intermediate zone of radius $a_1$ and having a softening temperature greater than that of central zone, said intermediate zone being such that $a_0 < a_1 < a$ and not containing any fluorescent dopant.

The intermediate zone interposed between the central zone and the peripheral zone and having a softening temperature higher than that of the zone containing the fluorescent dopant thus constitutes a barrier to migration of the dopant during the various operations in which the preform is heated to above the softening temperature of the zone containing the index-raising dopants (and in particular during preform collapsing). The fluorescent dopant thus remains confined to the central zone of the core, so that the desired efficiency is indeed obtained.

In the prior art described and for a Gaussian distribution of pumping intensity or of intensity of the signal to be transmitted, the confinement factor $\epsilon$ of the fluorescent dopant is substantially equal to the ratio of the radius of the active zone over the mode radius of the pumping signal or of the signal to be transmitted by the fiber, giving a value of the order of 50%. With the fiber of the invention, the confinement factor is less than 10%, which represents an improvement by a factor of five or more over the prior art.

Also, because of the invention, it is easy to control both the diameter of the active zone since the presence of the intermediate zone makes it possible to avoid changing the initial confinement during the collapsing operation, and the mode diameter which is a function, in particular, of the index difference between the peripheral zone and the cladding, and also the core radius since there is no difficulty within conventionally known limits in adding index-raising dopants in said peripheral zone without that being harmful to confinement of the active dopant, as it is in the prior art.

Advantageously, to obtain a softening temperature of the intermediate zone higher than the softening temperature of the central zone of the core, said intermediate zone contains little or no index-raising dopant (it is the peripheral zone that makes it possible to obtain the index difference that is required for signal confinement within the core of the optical fiber).

The softening temperature of the intermediate zone is thus controlled by an appropriate selection of dopants and of dopant concentrations.

It is also possible to select the softening temperature of the intermediate zone so that it is greater than that of the peripheral zone, thereby making it possible to avoid dopants diffusing from the peripheral zone towards the central portion of the core.

The invention is applicable generally and regardless of which three or four transition level fluorescent dopant is used; it is particularly advantageous when the dopant, e.g. erbium, possesses three transition levels.

Other characteristics and advantages of the present invention appear from the following description of a fiber of the invention, given by way of non-limiting illustration.

In the following figures:

In the figures, elements in common are given the same reference numerals.

FIG. 1 is a cross-section through an optical fiber 1 of the invention which comprises, disposed coaxially from the inside towards the outside:

Figure 1:
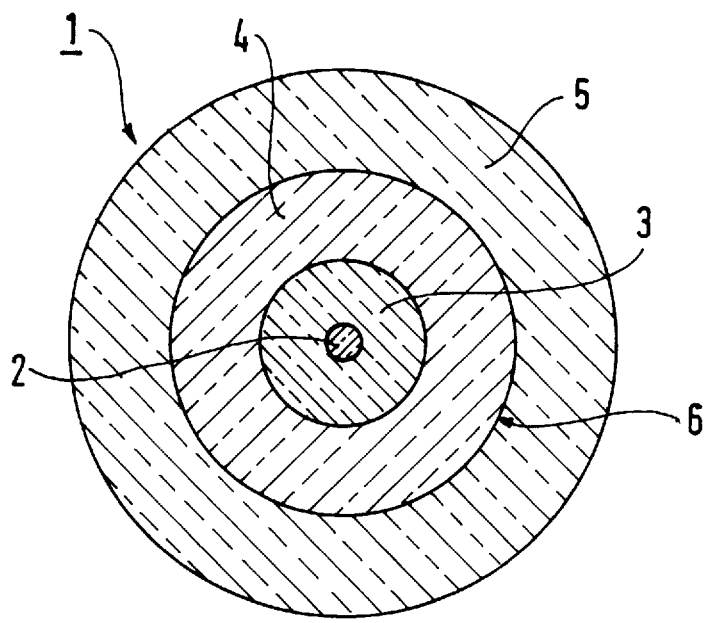
FIG. 1 is a cross-section of an optical fiber of the invention.

a central zone 2 constituting the active zone, based on silica containing a fluorescent dopant such as erbium, together with aluminum, and possibly other index-raising dopants such as germanium, for example;

an intermediate zone 3 of the invention based on silica that is doped little or not at all, such that its refractive index is less than that of the central zone 2, and its softening temperature is greater than that of the central zone 2;

a peripheral zone 4 based on silica that is doped so that firstly its refractive index is greater than that of the intermediate zone 3 and not less than that of the central zone 2, and secondly its softening temperature is less than that of the central zone 2, e.g. using dopants such as germanium, phosphorus, etc. . . . ; and optical cladding 5 based on silica that is not doped or that is doped so that its refractive index is less than that of silica, e.g. by using fluorine.

The core 6 of the optical fiber 1 is constituted by the central zone 2, the intermediate zone 3, and the peripheral zone 4.

The radius of the central zone 2 is written $a_0$, the radius of the intermediate zone 3 is written $a_1$, and the radius of the core 6 is written $a$. The difference of refractive index between the peripheral zone 4 and the cladding 5 is written $\Delta n$, and the difference between the refractive index of the intermediate zone 3 and that of the cladding 5 is written $\Delta n'$.

Figure 2:
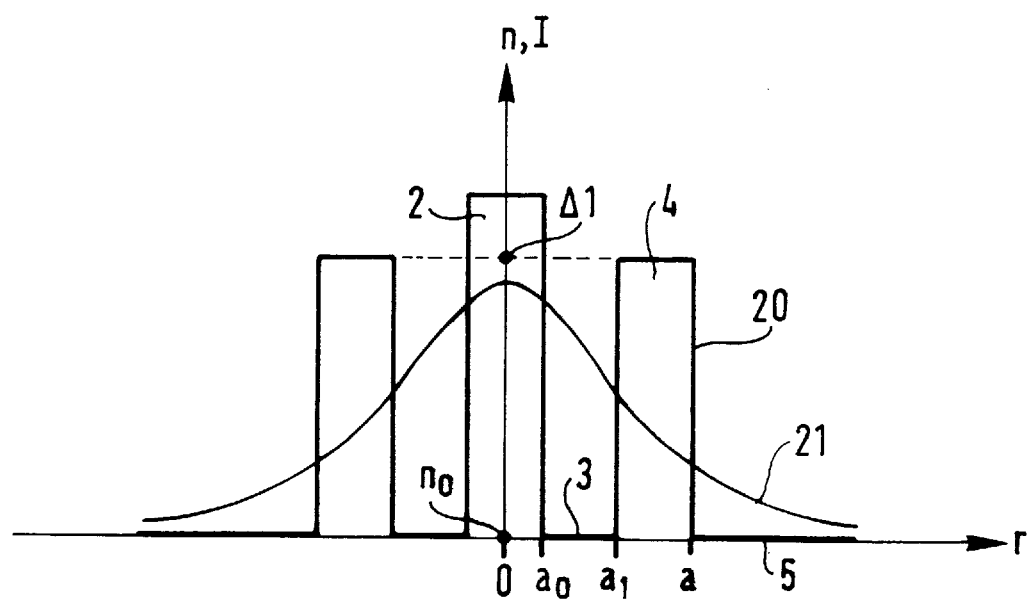
FIG. 2 shows the index profile of the optical fiber of FIG. 1 in a first variant of the invention.

FIG. 2 shows a first possible ideal index profile for the fiber 1 of FIG. 1: the curve 20 shows the refractive index $\underline{n}$ as a function of radius r, while the curve 21 shows the intensity I of the pumping signal or of the signal to be transmitted by the fiber 1 as a function of radius r. In this variant, the intermediate zone 3 of the invention has a refractive index substantially equal to that of the cladding 5 (i.e. $\Delta n'$ is zero), and the peripheral zone 4 has a refractive index that is slightly less than that of the central zone 2. The refractive index of the cladding 5 is substantially equal to the refractive index of pure silica, $n_0$.

Figure 3:
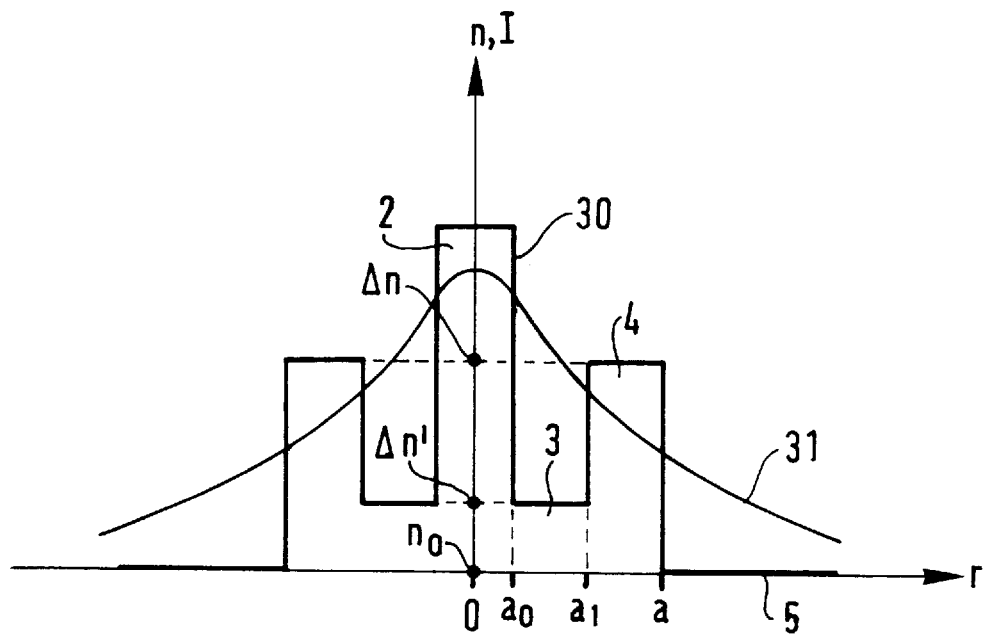
FIG. 3 shows the index profile of the optical fiber of FIG. 1 in a second variant of the invention.

FIG. 3 shows a second possible ideal index profile for the fiber 1 of FIG. 1: the curve 30 shows the refractive index $\underline{n}$ as a function of radius r, while the curve 31 shows the intensity I of the pumping signal or of the signal to be transmitted by the fiber 1 as a function of radius r. In this variant, the intermediate zone 3 of the invention has a refractive index greater than that of the cladding 5, which is substantially equal to that of pure silica (i.e. $\Delta n'$ is not zero), but it is still well below that of the central zone 1 so that, in accordance with the invention, it limits diffusion of the active dopant from the central zone 2 towards the intermediate zone 3 because of the difference in softening temperatures between the two zones. The peripheral zone 4 has a refractive index that is slightly less than that of the central zone 2.

Figure 4:
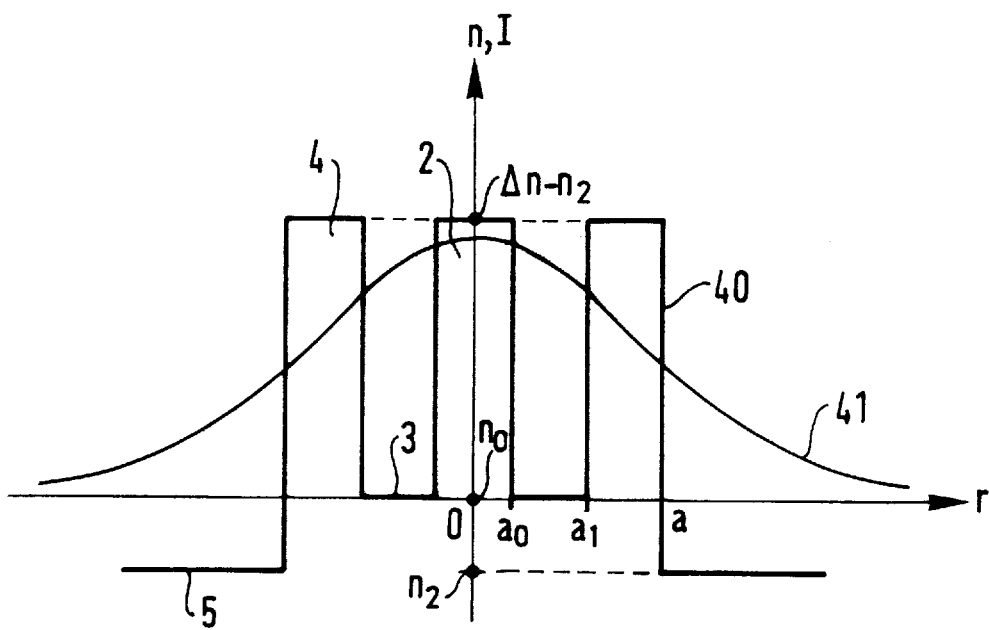
FIG. 4 shows the index profile of the optical fiber of FIG. 1 in a third variant of the invention.

Finally, FIG. 4 shows a third possible ideal index profile for the fiber 1 of FIG. 1: the curve 40 shows the refractive index $\underline{n}$ as a function of radius r, and the curve 41 shows the intensity I of the pumping signal or of the signal to be transmitted by the fiber 1 as a function of radius r. In this variant, the central zone 2 and the peripheral zone 4 have refractive indices that are substantially equal, and the cladding 5 has a refractive index $n_g$ lower than the index no of pure silica. In this profile, the index step constraints on the peripheral zone 4 are less than those of the profiles of FIGS. 2 and 3 because the index difference $\Delta n$ is obtained in part because of the negative index of the cladding 5, i.e. it is no longer necessary to use such a high concentration of index-raising dopants in the peripheral zone 4 as it is in the preceding variants.

From these three profiles, it can be seen that in an optical fiber of the invention it is possible for the central active zone 2 to be doped in such a manner that its index is greater than that of the cladding 5, e.g. by using germanium in addition to the aluminum that must be present in order to avoid erbium clustering. Even if that reduces the softening temperature of the central zone 2, because the intermediate zone 3 retains a softening temperature that is considerably higher, it can continue to act as a barrier against diffusion of the fluorescent dopant.

It will be clear from the above that the invention makes it possible to reduce the confinement factor $\epsilon$ in two ways:

firstly by making it possible to conserve confinement of the fluorescent dopant while the preform is being heated, because of the intermediate zone 3 which prevents the fluorescent dopant from diffusing; and secondly by allowing the mode diameter of the fiber 1 to be increased by modifying the refractive index of the peripheral zone 4, i.e. by modifying the concentrations of index-raising dopants so as to obtain the desired index difference $\Delta n$.

It is possible to increase this mode diameter when the pumping intensity or the intensity of the signal to be transmitted has a relatively flat central peak, since under such circumstances the desired interaction is conserved firstly between the dopant ions and the pumping photons in the central zone, and simultaneously secondly between the inverted ions and the photons of the signal to be transmitted throughout the core.

Also, it is recalled that in an amplifying optical fiber, it is not possible to reduce the confinement factor without limit.

The gain of the amplifier is proportional to the confinement factor, to the concentration of inverted doping ions, and to the length of the amplifying fiber. Thus, as the confinement factor is decreased, other things remaining equal, gain decreases, and that should be avoided. It is therefore necessary to compensate the decrease in confinement factor by increasing the length of the amplifying fiber since the concentration of inverted dopant ions has an upper limit that cannot be exceeded for reasons that are not described in detail herein. Unfortunately, the length of the amplifying fiber cannot be increased indefinitely either since the longer the fiber the greater the attenuation losses on the signal to be transmitted.

It is therefore necessary to find a compromise between decreasing the confinement factor, thereby making it possible to increase pumping efficiency, and increasing amplifier gain. For this purpose, the confinement factor can be considered as the ratio between the radius of the active zone and the mode radius for a Gaussian distribution of pumping signal intensity or of intensity of the signal to be transmitted. When distribution is not Gaussian, a more general formula is used for the confinement factor, given by:

$$\epsilon = \frac{\int_0^{a_0} \phi^2(r) r \, dr}{\int_0^{\infty} \phi^2(r) r \, dr}$$

where $\phi$ represents the guided electromagnetic field envelope.

The above-mentioned comprise leads to selecting a confinement factor that is less than 50%. For such a confinement factor, the parameters $a_0$, $a_1$, $\underline{a}$, $\Delta n$, and $\Delta n'$ for an optical fiber of the invention can be selected to lie in the following ranges:

$1 \, \mu m \leq a_0 \leq 2 \, \mu m$
$2 \, \mu m \leq a_1 \leq 4 \, \mu m$
$2 \, \mu m \leq a \leq 4 \, \mu m$
$20 \times 10^{-3} \leq \Delta n < 30 \times 10^{-3}$
$0 \leq \Delta n' \leq 20 \times 10^{-3}$
$\Delta n' < \Delta n$ It will be observed that the person skilled in the art can perform digital simulations enabling the various parameters given above to be selected so as to obtain the desired confinement, mode diameter, and field envelope.

Naturally, the present invention is not limited to the above description, and any means may be replaced by technically equivalent means without going beyond the ambit of the invention.

We claim:

1. An optical fiber comprising an optical core (6) based on silica for guiding the majority of lightwaves and containing at least one fluorescent dopant, surrounded by optical cladding (5) likewise based on silica, and having a refractive index lower than that of said core, said core comprising:

a central zone (2) of radius $a_0$, containing said fluorescent dopant; and a peripheral zone (4) of radius $\underline{a}$, surrounding said central zone, having a refractive index greater than that of said cladding, and not containing fluorescent dopant;

the fiber being characterized in that said core (6) further comprises an intermediate zone (3) of radius $a_1$ and having a softening temperature greater than that of central zone (2), said intermediate zone (3) being such that $a_0 < a_1 < a$ and not containing any fluorescent dopant.

2. An optical fiber according to claim 1, characterized in that said intermediate zone (3) has little or no doping with refractive index increasing dopants, such that its refractive index is greater than or equal to that of said optical cladding (5), and less than that of said peripheral zone (4).

3. An optical fiber according to claim 1, characterized in that said peripheral zone (4) has a refractive index less than or substantially equal to that of said central zone (2).

4. An optical fiber according to claim 1, characterized in that said optical cladding (5) has a refractive index less than or substantially equal to that of pure silica.

5. An optical fiber according to claim 1, characterized in that said intermediate zone (3) has a softening temperature greater than that of said peripheral zone (4).

6. An optical fiber according to claim 1, characterized in that said intermediate zone (3) has a refractive index equal to or slightly greater than that of said cladding (5).

7. An optical fiber according to claim 1, characterized in that it is monomode at the wavelength of the signal it is to transmit, and also at the pump wavelength of said fluorescent dopant.

8. An optical fiber according to claim 1, characterized in that said fluorescent dopant has three transition levels.

9. An optical fiber according to 1, characterized in that said dopant is a rare earth.

10. An optical fiber according to claim 9, characterized in that said dopant is erbium.

11. An optical fiber according to claim 1, characterized in that $a_0$ lies in the range 1 $\mu m$ to 2 $\mu m$, $\underline{a}$ lies in the range 2 $\mu m$ to 4 $\mu m$, and $a_1$ lies in the range 2 $\mu m$ to 4 $\mu m$, and in that the index difference $\Delta n$ between the refractive index of said intermediate zone (3) and that of said cladding (5) lies in the range $20 \times 10^{-3}$ and $30 \times 10^{-3}$.

12. An optical fiber according to claim 11, characterized in that the index difference $\Delta n'$ between the refractive index of said peripheral zone (4) and that of said cladding (5) lies in the range 0 and $20 \times 10^{-3}$.

* * * * *